United States Patent
McGilvery (12) 
(10) Patent No.: US 6,186,208 B1
(45) Date of Patent: Feb. 13, 2001

(54) AUTOMATIC CASSETTE WRAPPING AND ASSEMBLY MACHINE

(75) Inventor: Patrick L. McGilvery, Whitehouse, OH (US)

(73) Assignee: Intellishell, Inc., Toledo, OH (US)

( * ) Notice: Under 35 U.S.C. 154(b), the term of this patent shall be extended for 0 days.

(21) Appl. No.: 09/313,753

(22) Filed: May 27, 1999

Related U.S. Application Data (60) Provisional application No. 60/087,257, filed on May 29, 1998, and provisional application No. 60/122,441, filed on Mar. 2, 1999.

(51) Int. Cl.[7] .................................................. B32B 31/00
(52) U.S. Cl. ......................... 156/443; 156/566; 156/570; 156/578
(58) Field of Search .................................. 156/443, 556, 156/566, 569, 570, 578

(56) References Cited

U.S. PATENT DOCUMENTS

| | | | |
|---|---|---|---|
| 5,311,388 | * 5/1994 | McLaren | 360/132 |
| 5,414,582 | * 5/1995 | McLaren | 360/132 |
| 5,568,898 | * 10/1996 | Gelardi et al. | 242/344 |
| 5,568,899 | * 10/1996 | Krantz et al. | 242/347.2 |
| 5,584,440 | * 12/1996 | Krantz | 242/347 |
| 5,894,268 | * 4/1999 | McLaren | 340/572 |

* cited by examiner

Primary Examiner—James Sells
(74) Attorney, Agent, or Firm—Emch, Schaffer, Schaub & Porcello Co., L.P.A.

(57) ABSTRACT

An automatic cassette wrapping machine includes three interconnected stations: a station for loading cassettes and inserting cassettes into an assembly line; a station for receiving the cassettes and engaging the cassettes with paperboard sheaths having preapplied glue; and a station for receiving the sheath encased cassettes and stacking the cassettes in shippable pluralities. The cassette assembly machine is fully automated and includes a central processing unit receiving signals from sensors positioned throughout the machine to coordinate all aspects of machine operation.

15 Claims, 12 Drawing Sheets

AUTOMATIC CASSETTE WRAPPING AND ASSEMBLY MACHINE

This patent application is being filed as a conversion of provisional application Ser. No. 60/087,257 filed May 29, 1998 and provisional application Ser. No. 60/122,441 filed Mar. 2, 1999. All disclosures and information contained in both provisional applications are expressly incorporated herein.

The present invention relates to an automatic cassette wrapping and assembly machine for use in manufacturing video cassettes, including but not limited to the type disclosed in U.S. Pat. No. 5,311,388. For the purposes of this patent application and description, the invention will be described for the wrapping and assembly of VHS-type tape cassettes. However, the description is not intended to be limiting upon the scope of the claims which are appended hereto.

It has long been an objective in the audio and video duplication industry to provide for the enhanced manufacture and assembly of cassettes, tapes and their labeling and packaging. Commonly, such cassettes and tapes receive labeling which is adhered directly to the cassette or tape body and the labeled cassette or tape is then placed in corrugated packaging having labeling and graphics applied thereto. Need for the corrugated sheath or container for such cassettes and tapes has been eliminated by cassettes of the type shown in U.S. Pat. No. 5,311,388. Cassettes or tapes of the type shown in the '388 patent have a sheath or label which is applied to the outer surfaces of the cassette or tape which include the complete graphics and labeling, thereby eliminating the need for the outside cover. The cassette of the '388 patent is simply labeled and wrapped in clear wrap to seal its surfaces prior to shipping. Such cassettes, to date, are time-consuming in their manufacture and use as the outer sheath or label is usually hand applied. Thus, there is a need for an automatic cassette wrapping and assembly machine which performs the steps of applying the sheath to the cassette in a rapid, repetitive automated fashion.

SUMMARY OF THE INVENTION

The present invention provides an automatic cassette wrapping and assembly machine generally composed of three stations: a station for loading cassettes and inserting cassettes into the assembly line; a sheath assembly and wrapping station; and a discharge and stacking station.

The loading and insertion station includes a magazine in which the cassettes are loaded and stacked. The magazine described herein has a capacity to retain rows of 60 units with a capacity of ten rows, thus providing for 600 cassettes in a fully loaded magazine. However, magazine capacity may be designed to meet demand. The machine, as described herein, is designed to process a minimum of 60 cassettes per minute, thereby a fully loaded magazine provides a ten minute operative capacity. A lowering and insertion member is designed to support the rows of stacked cassettes and insert one row at a time onto a feed conveyor member which transports the row of cassettes to the assembly station. The feed conveyor member is provided with a continuous belt and includes a guide member which prevents the row of cassettes from slipping out of position. The conveyor member is driven by stepper motors which receive drive inputs from a central processing unit, the inputs being regulated by sensing devices positioned to determine the relative positioning of cassette members throughout the machine. The sensors monitor the flow of cassettes on the conveyor and are used to signal when the conveyor is clear for insertion of another row of cassettes. Other sensors are used to monitor for the proper orientation and positioning of the cassettes as they approach the assembly station.

The assembly station is comprised of a flight conveyor which receives the cassettes from the feed conveyor and lifts the cassettes vertically into a compression conveyor. A sheath prefold and glue applicator apparatus operates in cooperation with the flight conveyor and compression conveyor. The flight conveyor includes a series of lift members driven by motors, preferably stepper motors programmed to move the distance of one cassette at a time, which carry a single cassette into an aligning track and into the compression conveyor. The compression conveyor receives the cassette which has engaged with a sheath having preapplied glue positioned at the mouth of the compression conveyor. As the cassette and sheath move through the compression conveyor, the pre-glued sheath is compressed and wrapped around the cassette. Sensors monitor the positioning of the cassettes and sheath and provide information signals to the central processing unit related to the cassette positioning on the flight conveyor; cassette positioning in the compression conveyor; sheath positioning and orientation; and cassette engagement with the sheath.

As the cassettes are approaching the flight conveyor and being positioned through engagement with the flight conveyor and aligning track, the sheath prefold and glue application apparatus is feeding sheath members with preapplied glue into position proximate the entrance to the compression conveyor for engagement with each approaching cassette. Individual sheaths are removed from a stack and each sheath is prefolded along scored lines and then straightened. The prefolded and straightened sheath receives an application of glue and is driven into its final position at the entrance to the compression conveyor. Again, sensors are positioned in the sheath transfer and glue application system to ensure proper positioning of the sheath with respect to the oncoming cassette, positioning of the sheath through the prefolding, straightening and gluing steps and for providing signals regarding the presence of defective and improperly positioned sheaths. After a sheath is positioned at the mouth of the compression conveyor, a cassette will be fed into the compression conveyor by the flight conveyor, first engaging the sheath along the spine of the cassette and then pressing the top flap, bottom flaps and end flaps of the sheath into engagement with the top surface, bottom surface and ends of the cassette respectively as the cassette and sheath move through the compression conveyor. It is envisioned that a quality control sensor to monitor the precise sheath wrap position on each finished cassette as the cassette exits the compression conveyor. As the cassette wrapped in the sheath exits the compression conveyor, it is guided onto a horizontally oriented compression chute having spaced rows of resilient fins designed to provide continuous pressure to the spine and ends of the sheath, thereby providing constant compression allowing the sheath and glue to set in position, thereby permanently bonding the sheath to the cassette.

As the cassette exits the compression chute, it is flipped to a horizontally oriented position onto a positioning conveyor which relays the cassette to the stacking station. The stacking station includes a bin having a vertically moving floor and an aligning and orienting apparatus located at the top of the bin. The aligning and orienting apparatus receives the cassettes from the positioning conveyor and orients them in rows of a preset number. As each row of cassettes becomes filled, a release mechanism is activated to drop the row of cassettes onto the floor of the stacking bin which is positioned immediately under the aligning and orienting apparatus. After each row of cassettes is deposited onto the floor of the stacking bin, sensors signal the central processing unit to activate a lift mechanism to lower the floor of the bin one cassette level to allow the next row of cassettes to be received from the aligning end orienting apparatus. After the bin is full, the stack of cassettes is ejected into an appropriate container and the floor of the bin is raised back to its starting position.

The present invention can be further appreciated by reference to the following description of the preferred embodiment of the invention with reference to the accompanying drawings. While the current embodiment, as described, dictates the use of specific types of drive mechanisms, motors and rollers, it is fully envisioned that the substitution of equivalent structure for the pneumatic lifts, stepper motors, servo motors, drive motors, compression rollers, conveyor belts, lift members, chain drives, gear and sprocket drives and sensors may be substituted without departing from the scope and overall vision of this invention.

DETAILED DESCRIPTION OF THE PREFERRED EMBODIMENT

Figure 1:
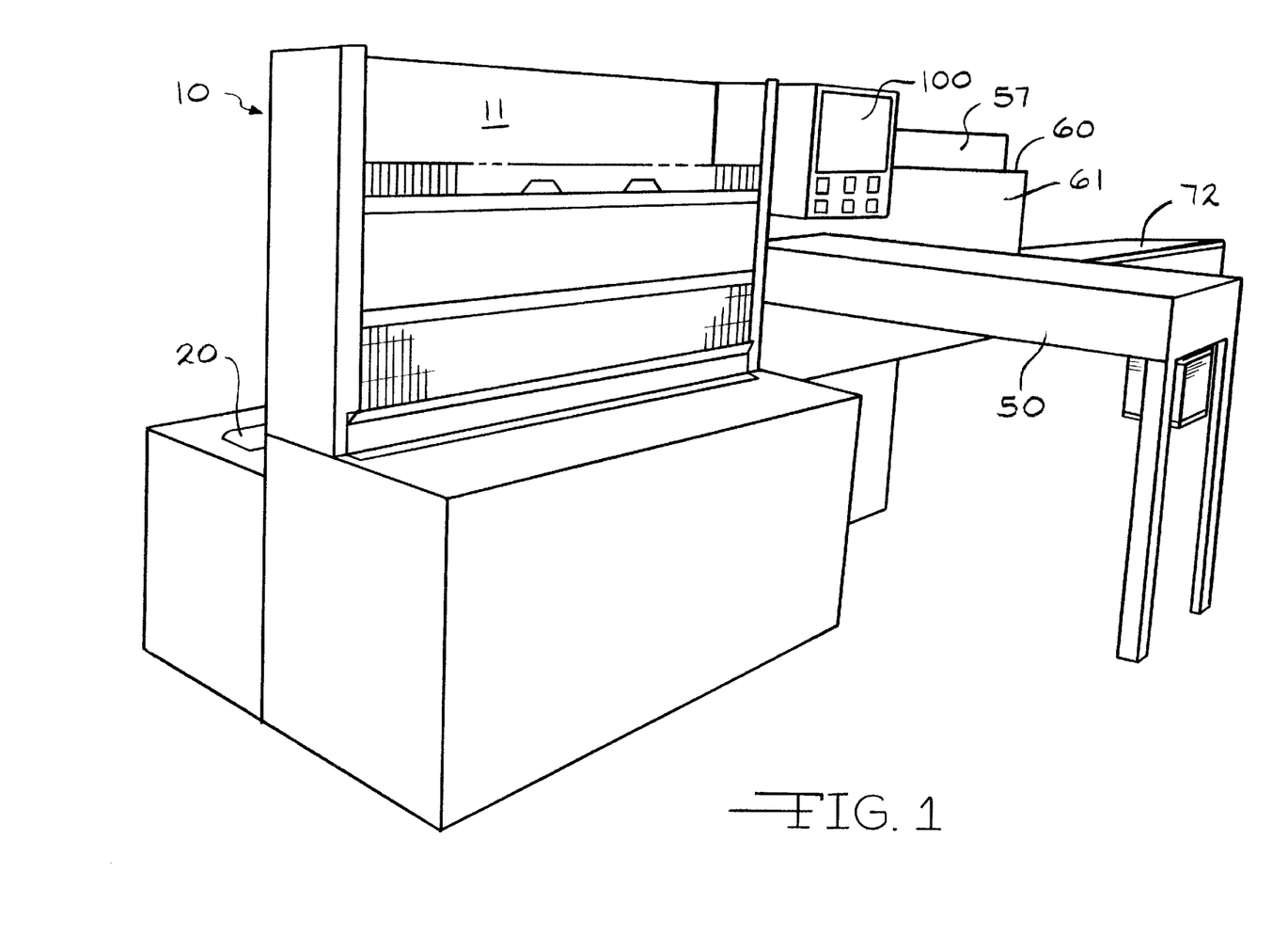
FIG. 1 is a perspective view of the cassette wrapping and assembly machine of the present invention.

Referring now to FIG. 1, the automatic cassette wrapping and assembly machine of the present invention includes the following components. A cassette loading and insertion apparatus 10 is positioned to retain stacked rows of cassettes for placement, one row at a time, onto the feed conveyor 20. The magazine 11 of the cassette loading and insertion apparatus 10 will provide capacity for ten stacked rows of VHS cassettes, each row containing sixty units. Thus, a fully loaded magazine 11 will contain 600 cassettes. All surfaces of the cassette loading and insertion apparatus 10 are preferably constructed of a hard canvas-based phenolic sheet chosen for its strong wear characteristics and its ability to provide a smooth non-abrasive surface on which the cassettes may slide, thereby preventing marking and any undesirable damage to the plastic cassette cases. It should be noted that all non-functioning and non-moving parts of the machine are preferably constructed of the same canvas-based phenolic sheet.

Figure 2:
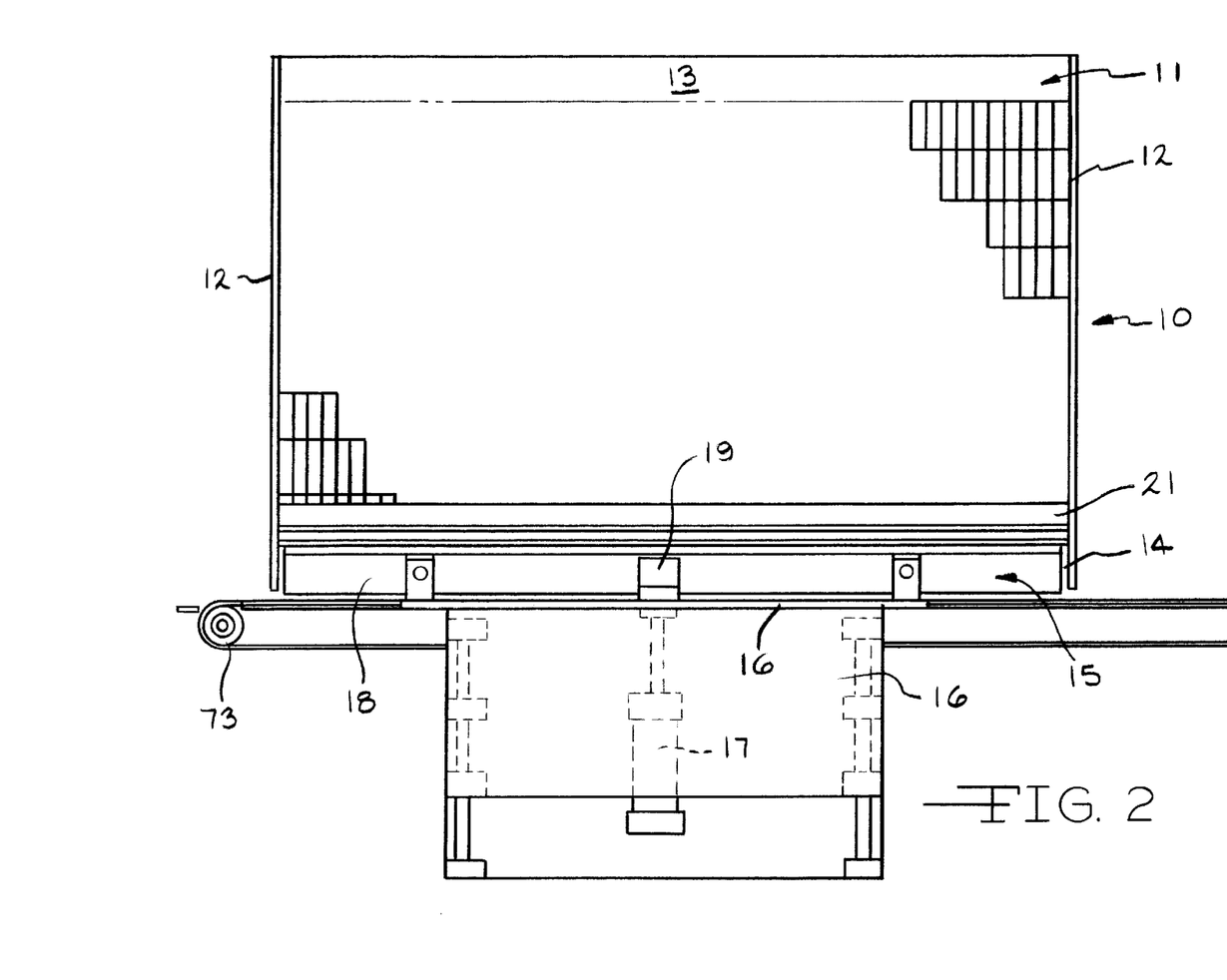
FIG. 2 is a front view, partially in ghost, of the cassette magazine and feed conveyor.
Figure 8A:
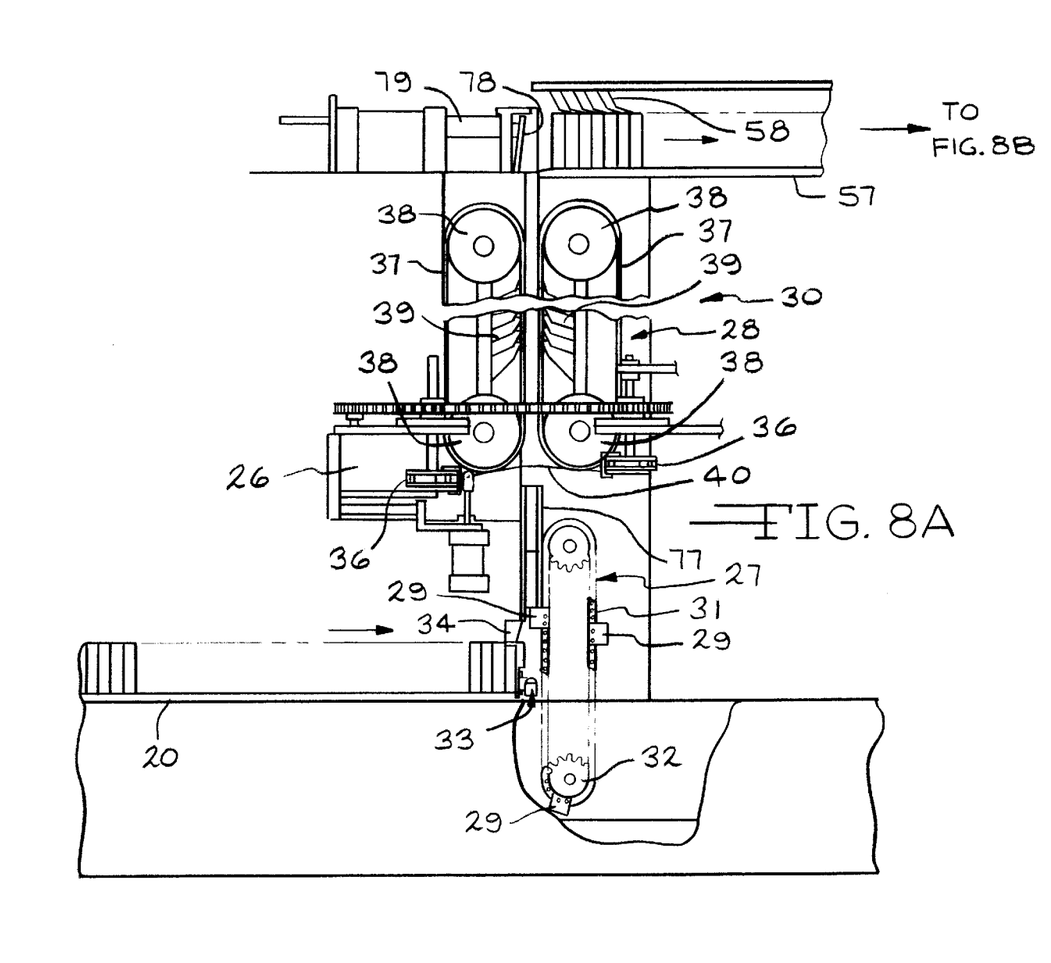
FIG. 8A is a partial cutaway side view of the cassette flight conveyor and compression conveyor and horizontally oriented feed and compression conveyor.

The feed conveyor 20 extends the length of the cassette loading and insertion apparatus 10 as shown in FIG. 2 and feeds to the assembly station 30 as shown in FIG. 8A.

Figure 8B:
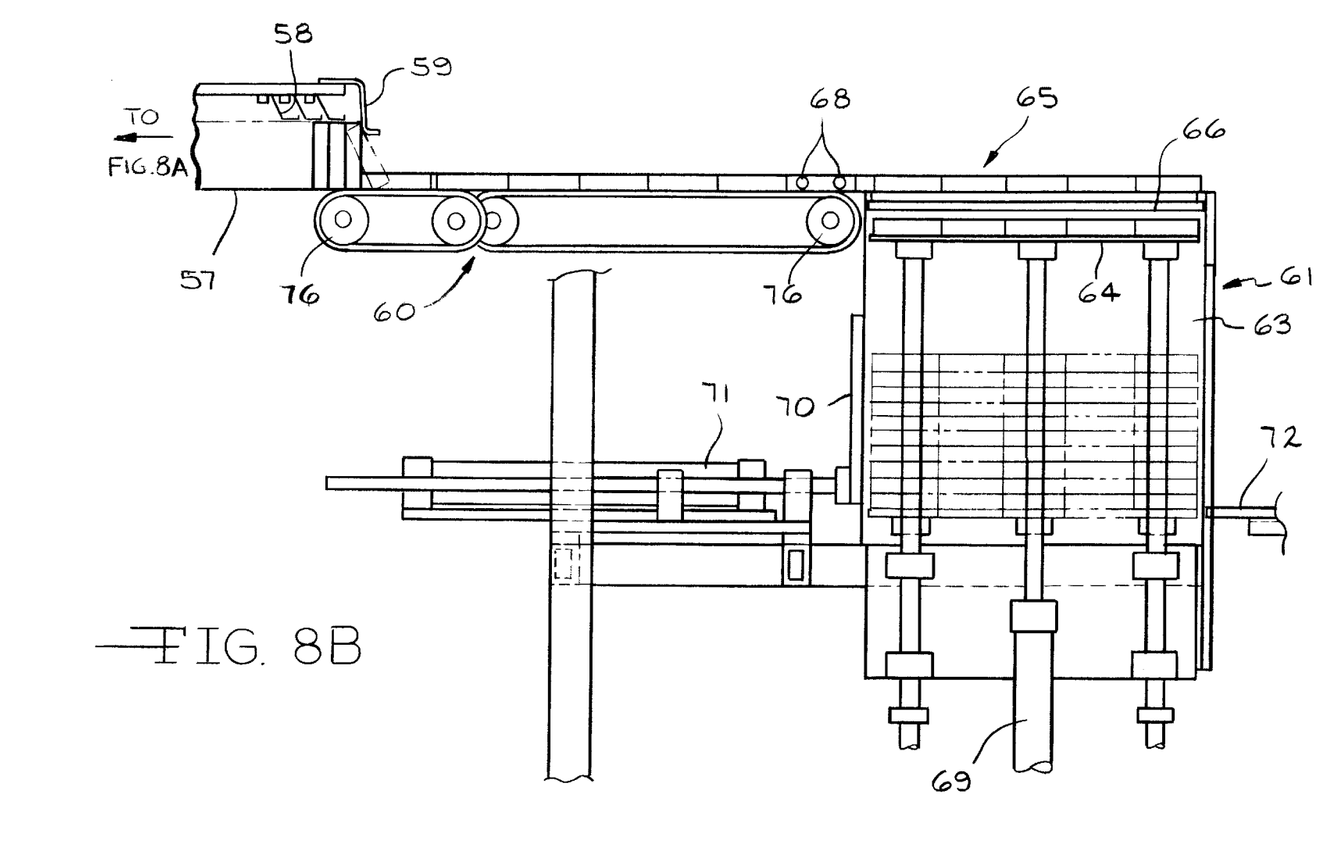
FIG. 8B is a partial cutaway side view of the continuation of the horizontally oriented feed and compression conveyor, positioning conveyor and stacking station.
Figure 9:
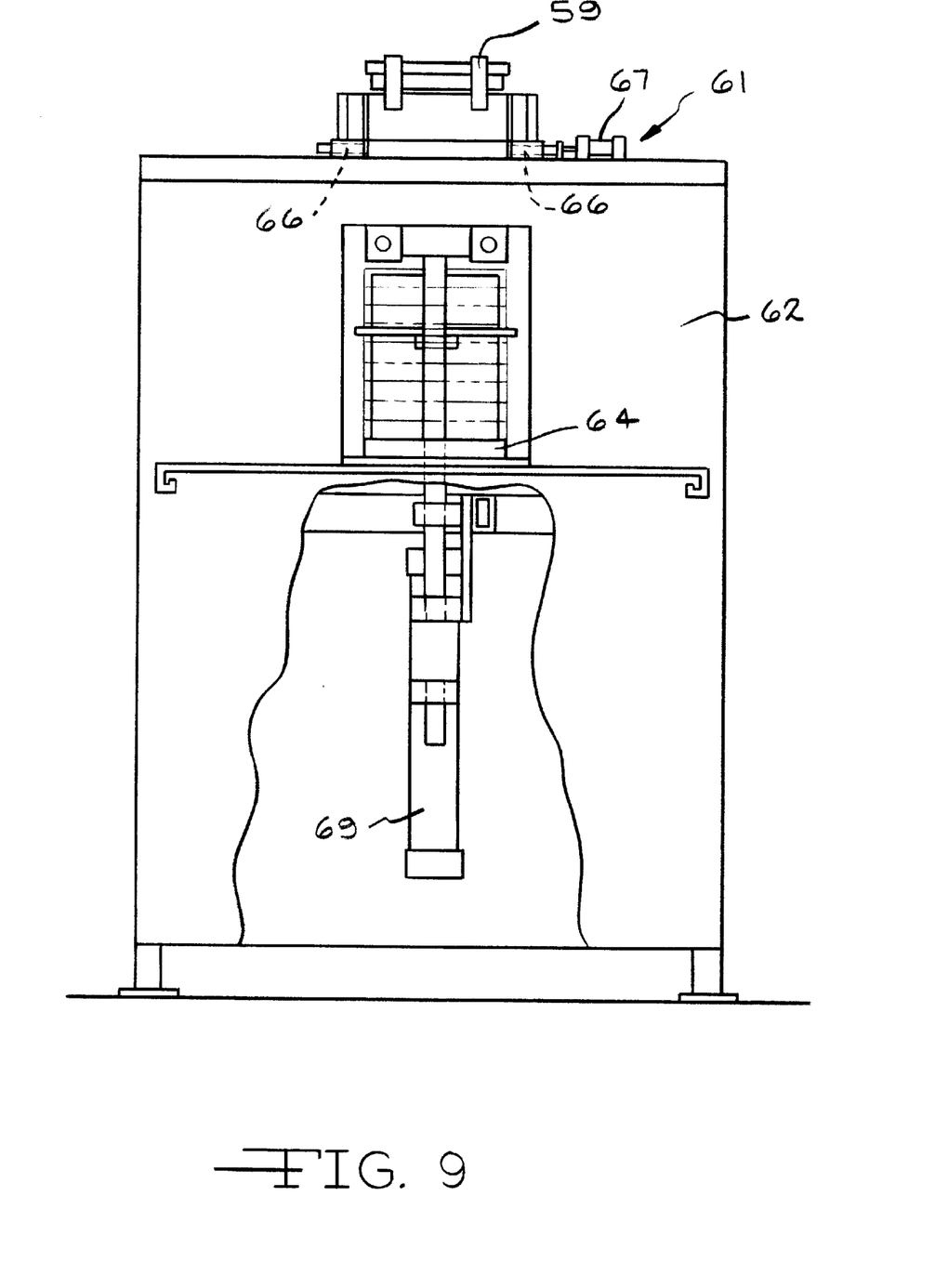
FIG. 9 is an end view showing the stacking station of the present invention.

Referring back to FIG. 1, the assembly station 30 includes a flight conveyor 27, shown in FIG. 8A, a compression conveyor 28, shown in FIG. 8A, and a sheath prefold and glue applicator apparatus 50 positioned adjacent the flight conveyor 27 and the compression conveyor 28 as shown in FIGS. 1 and 8B. Finally, as shown in FIGS. 1, 8B and 9, a compression chute 57 is positioned downstream of the compression conveyor 28 and combines with a positioning conveyor 60 to feed the fully assembled cassettes to the stacking station 61. The operation of the automatic cassette wrapping and assembly machine is controlled by a central processing unit 100.

Referring now to FIG. 2, the magazine 11 of the cassette loading and insertion station 10 is formed to have opposed sidewalls 12 and a backwall 13. The backwall 13 includes a slot 14 which runs the length of the backwall 13 and is slightly higher than the width of a standard VHS cassette, as shown in FIGS. 3–6. A lowering and insertion member 15 built for movement in the vertical and horizontal directions serves as the primary support for the vertically stacked rows of cassettes. The lowering and insertion member 15 includes a vertical elevator 16 which is raised and lowered by a pneumatic piston 17. A horizontally actuated support and insertion platform 18, driven by a pneumatic piston 19 is carried by the vertical elevator 16. The non-functional surfaces of the insertion and support platform 18 are constructed of the same canvas-based phenolic sheet to ensure a smooth non-abrasive surface on which the cassettes may slide. A lip member 21 is located across the bottom of the open front of the magazine 11 and is designed to engage the bottom most row of cassettes, thereby ensuring that all the cassettes are properly aligned when being lowered by the lowering and insertion member 15 for insertion onto the feed conveyor 20.

Figure 3:
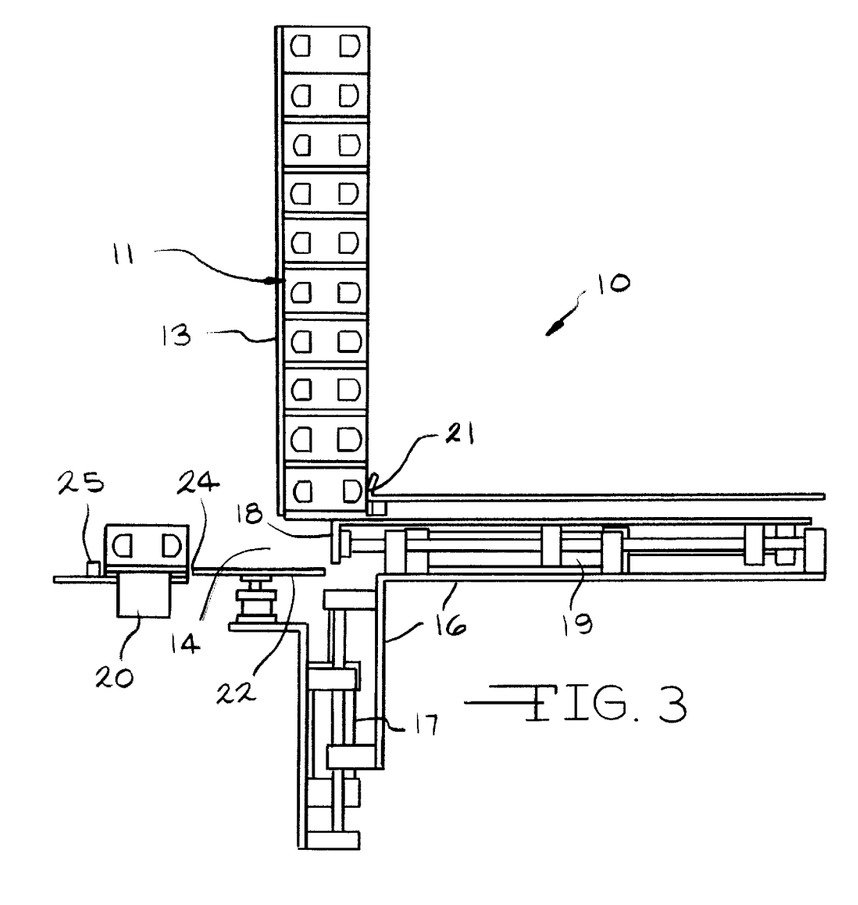
FIG. 3 is a side view of the cassette loading and insertion magazine showing the cassettes supported in an upraised position.
Figure 4:
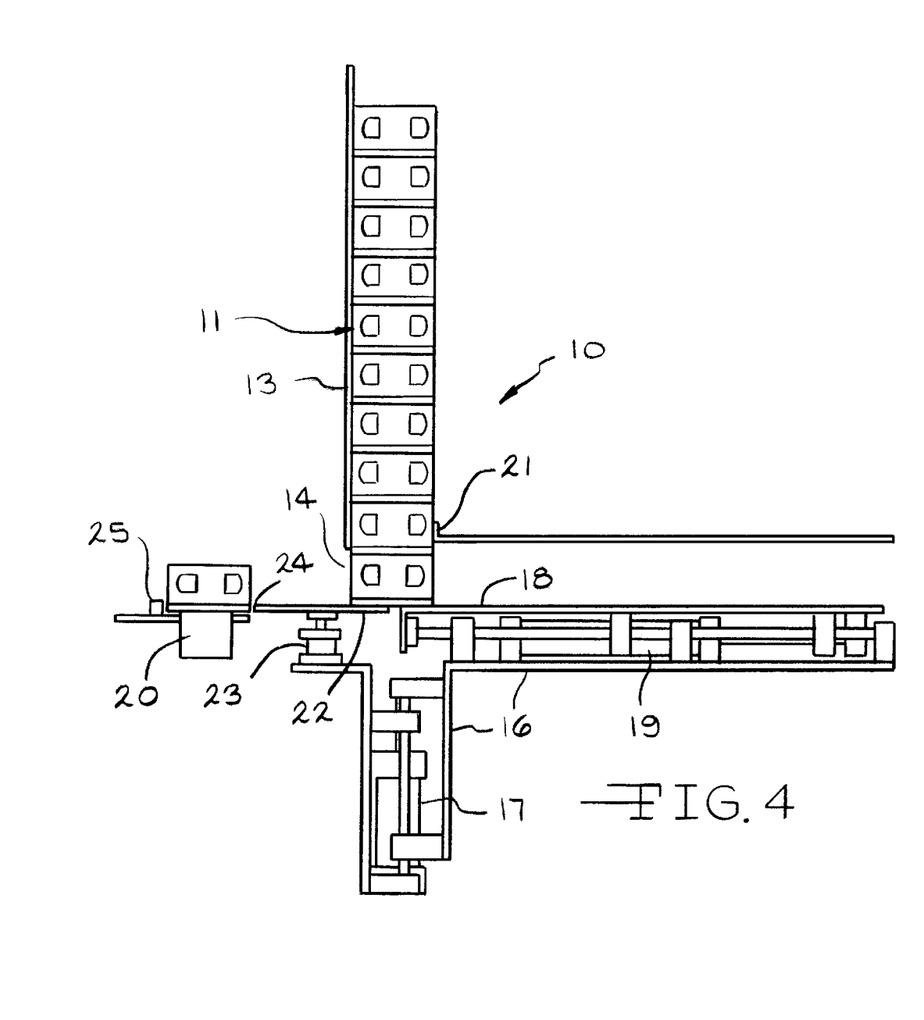
FIG. 4 is a side view of the cassette loading and insertion magazine showing the cassettes lowered to a position for placement on the feed conveyor.
Figure 5:
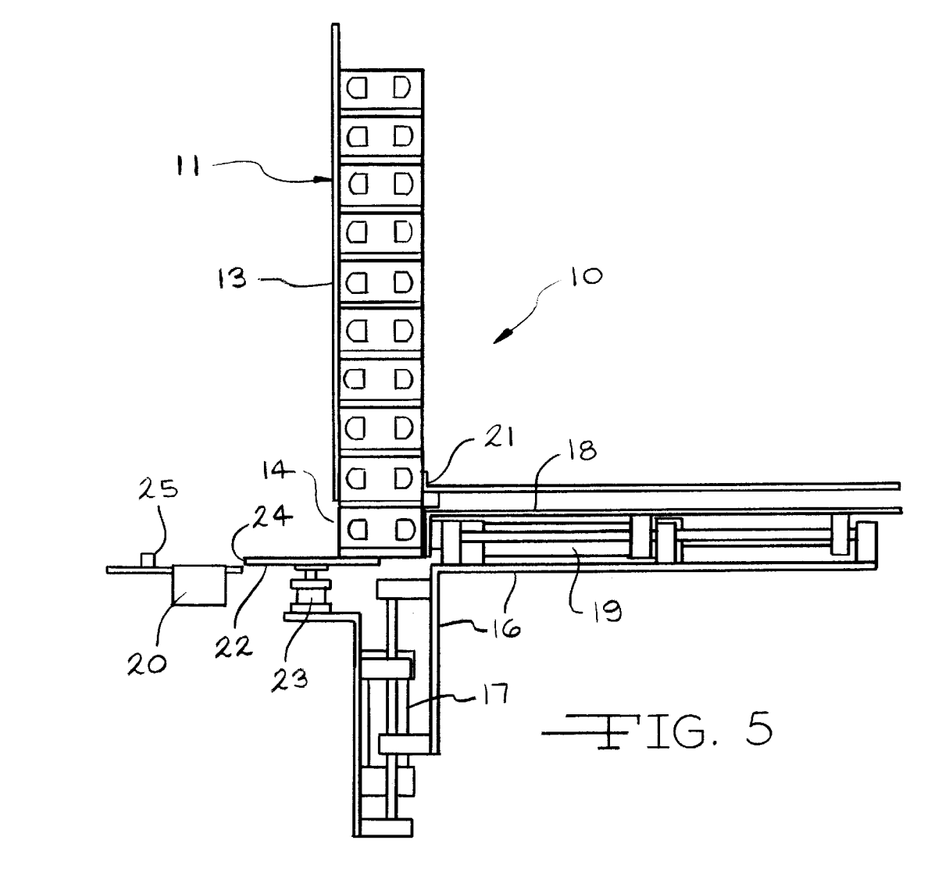
FIG. 5 is a side view of the cassette loading and insertion magazine showing the positioning of the insertion member for placing the cassette row on the feed conveyor.
Figure 5A:
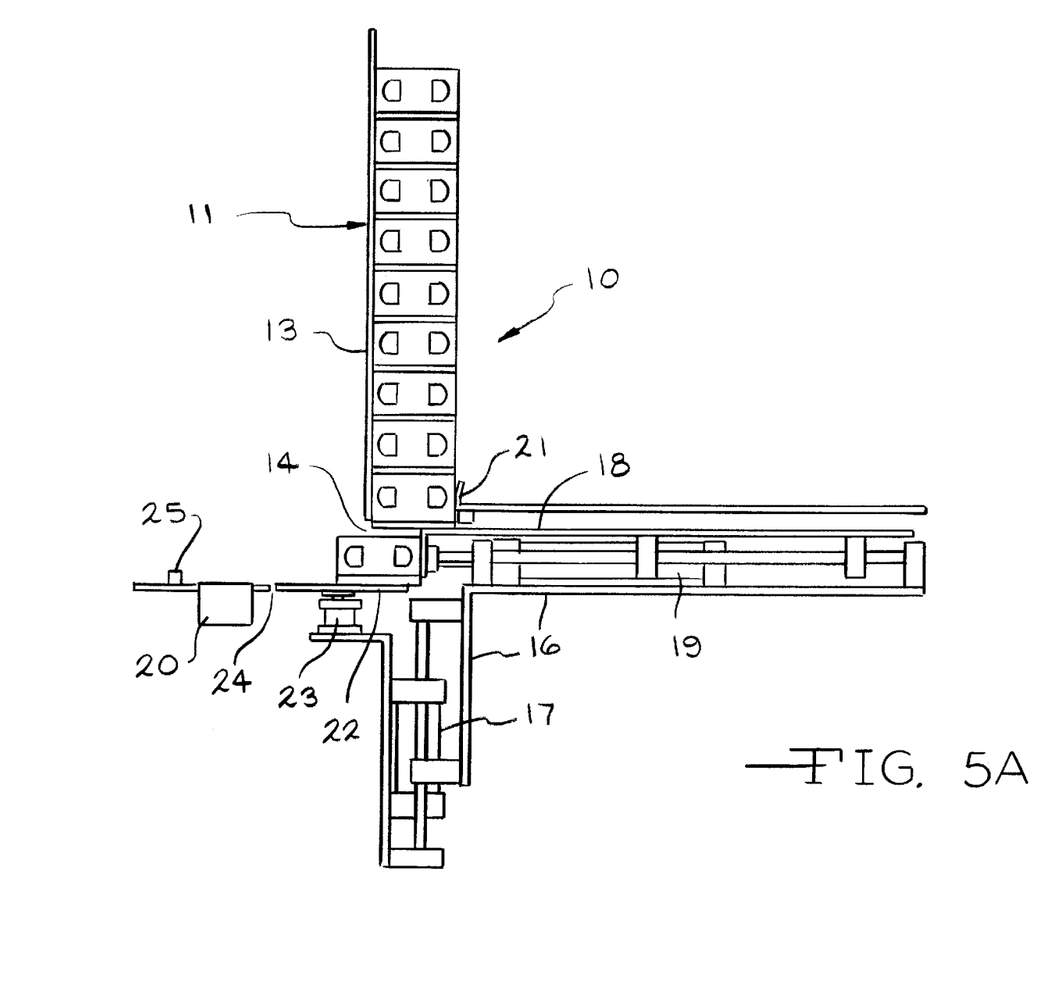
FIG. 5A is a side view of the cassette loading and insertion magazine showing the first row of cassettes partially inserted to the feed conveyor, while the next row of cassettes is supported by the insertion member.
Figure 6:
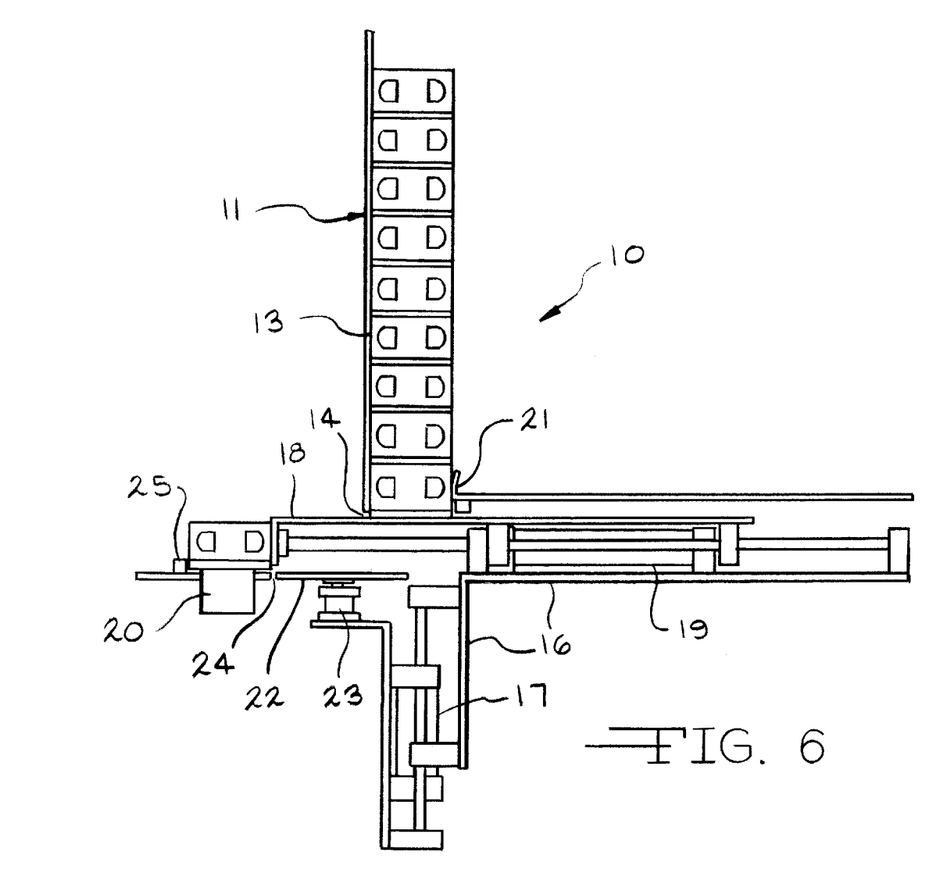
FIG. 6 is a side view of the cassette loading and insertion magazine showing the insertion member fully extended to place a row of cassettes on the feed conveyor.

Referring now to FIGS. 3–6, the operation of the cassette loading and insertion station 10 can be ascertained. FIG. 3 shows the cassette loading and insertion station 10 at its start position, wherein the rows of cassettes which are stacked in the magazine 11 are supported by the top surface of the support and insertion platform 18. A row of cassettes is shown in position on the feed conveyor 20 which are being fed to the assembly station 30. The insertion and support platform 18 is then vertically lowered by means of the elevator 16 and its piston 17 as shown in FIG. 4, thereby lowering the stacked rows of cassettes to now rest in position on the magazine floor 22. As the bottom row of cassettes engage and is supported by the floor 22 of the magazine, it aligns with the slot 14 in the back wall 13 of the magazine 11. The magazine floor 22 is supported by a piston 23 which activates to move the floor vertically an approximate distance of ¼ to ½ inch. After the cassettes are in a position of support on the magazine floor 22 as shown in FIG. 4, the insertion and support platform 18 is withdrawn from engagement with the bottom row of cassettes by its piston 19 and is vertically raised by the elevator 16 and piston 17 to be positioned immediately behind the bottom row of cassettes as shown in FIG. 5. The central processing unit, when signalled by the appropriate sensors (not shown) that the feed conveyor 20 is vacant, will activate the piston 19 to horizontally displace the insertion and support platform 18 to begin pushing the bottom row of cassettes through the slot 14. As shown in FIG. 5A, the insertion and support platform 18 pushes the bottom row of cassettes through the slot 14, and will begin supporting the immediately adjacent next row of cassettes on its top surface. As the next row of cassettes engage the top surface of the insertion and support platform 18, the central processing unit activates the piston 23 supporting the magazine floor 22 to lower the magazine floor 22 approximately ¼ to ½ inch, thereby relieving pressure between the bottom row of cassettes and the forces being applied by the weight of the stacked rows of cassettes now being supported by the insertion and support platform 18 as shown in FIG. 5A. The insertion and supporting platform 18 will continue pushing the bottom row of cassettes to the feed conveyor 20 across the magazine floor 22 while supporting the stacked rows of cassettes as shown in FIG. 6. Once the bottom row of cassettes is in position on the feed conveyor 20, the insertion and support member 18 will be withdrawn to its original starting position as shown in FIG. 3. The magazine floor 22 will vertically return to its starting position, thereby providing a guide surface 24 for the row of cassettes as they travel along the feed conveyor 20. A guide member 25 is positioned on the opposed side of the feed conveyor 20 to work with the guide surface 24 and properly align the cassettes as they proceed along the feed conveyor 20 to the assembly station 30.

Sensing devices (not shown) such as light emitting diodes or polarized infrared scanners are positioned in the magazine 11 to signal when the last row of cassettes has exited the magazine, the signal being sent to the central processing unit 100 to notify the operator to refill the magazine 11. Further sensors (not shown) are positioned about the feed conveyor 26 to monitor the flow of cassettes on the feed conveyor 20 and provide signals to the central processing unit when the feed conveyor 20 is clear for insertion of another row of cassettes and monitor the cassettes placed on the feed conveyor 20 to insure proper orientation and positioning of the cassettes as they approach the assembly station 30. The conveyor guides 25 are preferably constructed of ultrahigh molecular weight polyethylene. The conveyor belts 26 of the feed conveyor 20, as are all other conveyor belts of this invention, are constructed of true Teflon, the ends of which are laced together with a flush lacing designed to prevent tipping or otherwise disturbing the flow of cassettes to the assembly station 30. The feed conveyor 20 is operated by motors 73, preferably stepper motors, which index the feed conveyor belt 20 one cassette width at a time toward the assembly station 30.

Referring to FIG. 8A, the assembly station 30 includes two conveyor sections which act in unison to assemble the cassettes and sheaths. A flight conveyor 27 is positioned proximate the end of the feed conveyor 20 to receive cassettes as they are indexed to the assembly station 30. The flight conveyor 27 provides a vertical lift to each cassette and processes it into engagement with a prefolded, straightened and preglued sheath 40 positioned at the mouth of a compression conveyor 28. The flight conveyor 27 includes a series of lift members 29 positioned on a belt or chain 31 which is preferably driven by a stepper motor 32. The flight conveyor 27 also includes an aligning track 77 constructed of a Teflon material such as Delrinm which engages the ends of the cassettes and guides the cassettes in a desired orientation to the compression conveyor 28. The stepper motor 32 receives signals from the central processing unit 100 which direct it to index the flight conveyor 27 one cassette at a time. Sensors 33, such as infrared or light emitting diodes, monitor the positioning of the cassettes relative to the flight conveyor 27. The sensor 33 provides a signal to the central processing unit which in turn provides input to a stop member 34 which, when activated, engages the cassette on the feed conveyor 20 to prevent the cassette from engaging the lift members 29 of the flight conveyor 27 until all systems of the machine are readied for operation and the cassettes are inspected for proper orientation by appropriate sensors. Preferably, the lift members 29 of the flight conveyor 27 are spring loaded, thereby providing engaging surfaces which create a cushioning effect when the cassettes are engaging each other in the aligning track 77 to prevent overloading the stepper motors driving the flight conveyor 27. The central processing unit 100 receives signals from the various sensors and coordinates the operation of the stepper motors 73 which drive the feed conveyor 20, the stepper motors 32 which drive the flight conveyor 27, and the motors 26 which drive the sheath conveyor 36 and the motor (not shown) which drive the compression conveyor 28. If the central processing unit 100 receives appropriate signals from the sensors that a cassette is in proper alignment with the flight conveyor 27, the stop member 34 is signaled to release the cassette to be moved by the feed conveyor 20 into engagement with the lift members 29 of the flight conveyor 27. The cassette is then transported by the flight conveyor 27 into the aligning track 77 toward the compression conveyor 28. At the same time, a paper board sheath 40 is transported by the sheath conveyor 36 to a position immediately proximate the mouth of the compression conveyor 28. The paper board sheath is engaged with the spine of the cassette at the entrance to the compression conveyor 28. As the cassette and sheath 40 are carried into the compression conveyor 28, the spine of the cassette and sheath are pressed against the immediately preceding cassette already in the compression conveyor, thereby compressing the paper board sheath 40 against the spine of the cassette.

The compression conveyor 28 is preferably constructed of opposed Teflon belts 37 carried by low crush rollers 38 and a plurality of flexible fins 39 positioned so as to provide continuous compressive forces against the sheath covered cassette as it travels through the compression conveyor 28 thereby causing the sheath to adhere to the cassette.

Figure 7A:
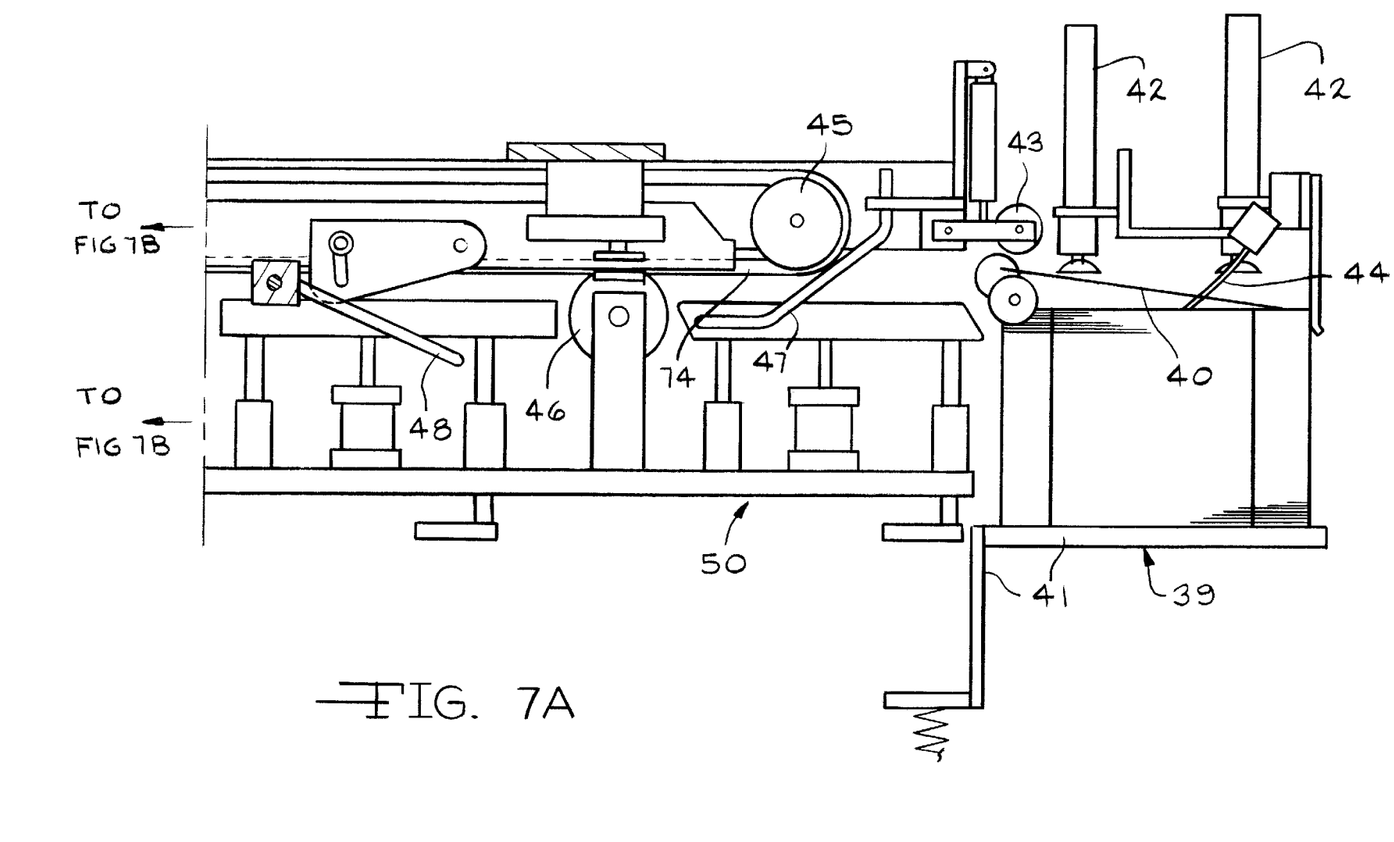
FIG. 7A is a partial side view of the front portion of the sheath prefold and glue application apparatus.
Figure 7B:
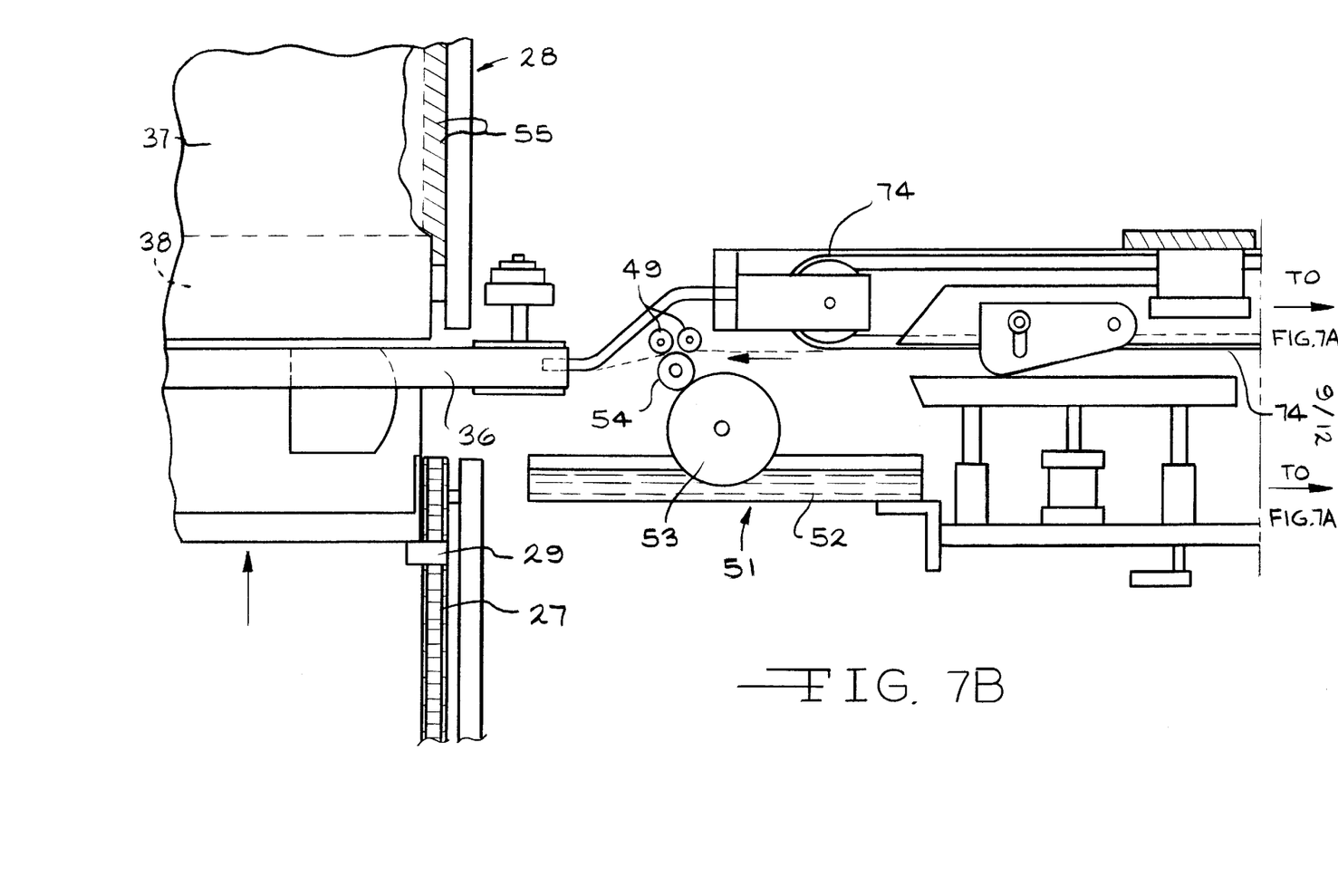
FIG. 7B is a partial side view of the remaining portion of the sheath prefold and glue application apparatus.

Referring now to FIGS. 7A and 7B, the sheath prefold and glue applicator apparatus 50 is shown. A stacking member 39 for retaining a stack of paper board sheaths which have the graphics for the particular video cassette preapplied includes a spring loaded elevator 41 which continuously raises as the sheaths 40 are removed from the stack. Vacuum pickups 42 remove the top sheath 40 from the stack of sheaths and place it into engagement with a positive drive roller 43 as shown in FIG. 7A. A sensor 44 determines the presence of sheaths in the stacking member 39 and if there are no sheaths remaining, the sensor 44 signals the central processing unit 100 to temporarily deactivate the machine until the stacking member 39 is replenished with sheaths. The sheath 40 is generally constructed of paperboard with appropriate graphics applied to one side. The sheath is precut and scored to provide the appropriate folding and openings necessary to properly encase the cassette.

After the sheath is driven through the positive drive roller 43 it engages a drive conveyor 45 which engages the spine of the sheath and drives the sheath through a folding station and an unfolding station. The drive conveyor 45 will support the sheath between a moving conveyor belt 74 and rollers 46. As the sheath proceeds downstream from the positive drive roller 43 it first engages a prefold arm 47 which forces the sides of the sheath to fold along the scored lines which parallel the spine of the sheath. Upon exiting the prefold arm 47 and having a prefold placed along the scored line, the sheath engages a straightening arm 48 which unfolds and straightens the prefolded sheath. The straightened sheath is now limbered along its prefold scores which will enhance the ability of the sheath to fully encompass and adhere to the cassette in the compression conveyor 28. After the sheath exits the straightening arm 48, it is engaged by drive rollers 49 which propel the sheath past a glue application apparatus 51. The glue application apparatus 51 includes a glue pot 52, a feeding wheel 53 engaged with the glue pot 52 and a final glue application roller 54 which applies a measured amount of glue onto the non-graphic portion of the sheath on specified areas only. Preferably, the edges of the sheath are kept clean from glue so that, as the sheath is applied to the cassette in the compression conveyor 28, excess glue will not be squeezed from the edges of the sheath onto the cassette or the drive mechanism of the machine. An opposed pair of driven Teflon belts 36 engage the sheath with glue applied, as it exits the glue application apparatus 51, along the edges of the sheath to drive the sheath into its final position located at the entrance or mouth to the compression conveyor 28. The parallel drive belts 36 which engage the edge of the sheath are positioned to apply a slight pressure to the sheath thereby causing the sheath to slightly fold or buckle along its scored lines, thereby enhancing adherence of the sheath to the cassette as the cassette engages the sheath by movement from the aligning track 77 to the compression conveyor 28.

Appropriate sensors (not shown) are used to ensure that the glue pot maintains sufficient quantities of glue and to ensure proper positioning of the sheath with respect to the oncoming cassette at the mouth of the compression conveyor 28. The sheath is also monitored as it passes through the prefold arm, straightening arm and drive rollers as well as the gluing station to ensure that the sheath maintains proper orientation and there are no defective sheaths entering the mouth of the compression conveyor 28. If a defective sheath is located, the drive belts 36 are signaled by the central processing unit to reject the sheath from the assembly station 30.

The operation of the assembly station can be followed by viewing FIGS. 7B and 8A. As the cassette is engaged by the flight conveyor 27 and lifted toward the aligning track 77 and compression conveyor 28, the sheath 40 with preapplied glue is driven by the drive belts 36 into position at the mouth of the compression conveyor 28. The cassette spine engages the spine of the sheath as the cassette is driven into the compression conveyor 28. The top flap and bottom flap of the sheath are then pressed into engagement with the top surface and bottom surface of the cassette as the sheath and cassette are moved into the compression conveyor 28 between the low crush rollers 38 and Teflon belts 37. Flexible fin members 39 are located along the travel path between the low crush rollers 38 and Teflon belts 37 continue the pressure on the Teflon belts 37 between the low crush rollers 38. Flexible end fins 55, shown in FIG. 7B, provide continuous pressure to the end flaps of the sheath, thereby pressing the end flaps of the sheath into engagement with the ends of the cassette. Thus, as the sheath encased cassette travels through the compression conveyor, the sheath is completely adhered to the cassette. The Teflon coated belts 37 are used throughout the compression conveyor 28 and other conveyor systems as they are impervious to the glue and any excess glue which may be squeezed from the cassettes and sheaths can be readily wiped off.

It is envisioned that automatic wipers for the Teflon belts 37 will be made as part of the overall apparatus of the invention.

As the sheath encased cassette exits the compression conveyor 28, as shown in FIG. 8A, it enters a horizontally oriented compression chute 57 which maintains the cassette in an upright vertical position. A pushplate 78 driven by a pneumatically powered piston 79 engages each cassette as it exits the compression conveyor 28 and directs the cassette into the compression chute 57. The compression chute 57 is designed to compress the top surfaces and bottom surfaces of adjacent cassettes together to facilitate the setting of the glue and final formation of the sheath application to the cassette. Further, rows of spaced resilient fins 58 are positioned to provide continuous pressure to the spine and ends of the cassette thereby applying continuous pressure to the spine and ends of the sheath, allowing the glue to set and permanently bond the sheath to the cassette. The resilient fins 58 may be constructed of any resilient and durable material.

Referring now to FIGS. 8B and 9, the sheath wrapped cassette exits the compression chute 57 and is flipped by a stop arm 59 to a horizontally oriented position and into engagement with a positioning conveyor 60. It should be noted that the positioning conveyor 60 is constructed of polyurethane belts and is driven by motors 76 such as stepper motors which receive signals from the central processing unit to move the cassettes one cassette unit at a time. The positioning conveyor 60 feeds the final cassette products to the stacking station 61 which includes a bin 62 having side walls 63 and a vertically moveable floor 64. Located at the top of the bin 62 in an area adjacent the positioning conveyor 60 is an aligning and orienting station 65. The aligning and orienting station 65 includes support members 66 which receive the cassettes as they are being positioned at the top of the bin 62. The aligning and orienting station 65 positions a preset number of cassettes for placement into the bin 62. Appropriate sensors (not shown) provide signals to the central processing unit which indicate when the aligning and orienting station 65 has received its full compliment of cassettes. At that time a pneumatic piston 67 engaged with the support rails 66 of the aligning and orienting station 65 is signaled by the central processing unit to separate the support rails 66 apart, thereby releasing the row of cassettes to drop onto the floor 64 of the stacking bin 62 which is positioned immediately under the support rails 66. A set of stops 68 located at the end of the positioning conveyor 60 are signalled by the central processing unit to close and prevent movement of cassettes from the positioning conveyor 60 onto the aligning and orienting station 65 when the aligning and orienting station 65 is full and the row of cassettes is being dropped to the floor 64 of the bin 62.

The floor 64 of the bin 62 is supported by a pneumatic piston 69 and controlled by the central processing unit 100 to maintain a position immediately under support rails 66 of the aligning and orienting station 65. After each row of cassettes is deposited onto the floor 64 of the bin 62, a sensor (not shown) signals the central processing unit which in turn signals the lift piston 69 to lower the floor 64 of the bin 62 down one level of one cassette thickness, thereby allowing room for the next row of cassettes to be received from the aligning and orienting station 65. Finally, the bin 62 includes a push wall 70 driven by a pneumatic piston 71 which is operated by signals from the central processing unit 100. When sensors (not shown) positioned in the bin 62 indicate that the bin 62 is full of stacked rows of completed cassettes, the controller signals the piston 71 to drive the push wall 70 through the bin 62 thereby pushing a ready stack of cassettes onto the packaging table 72. The floor 64 of the bin is then raised by its piston 69 back to its starting position.

While the current embodiment of the invention as described above dictates the use of specific types of drive mechanism, motors, rollers and sensors, it is fully envisioned that the substitution of equivalent structures for the pneumatic lifts, stepper motors, drive motors, compression rollers, conveyor belts, lift members, chain drives and gear and sprocket drives as well as any other structure in the invention, as shown in the figures, may be substituted without departing from the scope and overall vision of this invention.

I claim:

1. A cassette assembly apparatus comprising, in combination:

a magazine for holding a plurality of cassettes, an insertion member for removing at least a portion of such plurality of cassettes for processing at an assembly station;

said assembly station including a sheath conveyor for positioning a sheath having glue applied on one side for engagement with each such cassette received from said magazine, and a compression member for applying the sheath to the cassette; and a stacking station for receiving such sheath encased cassettes and aligning such sheath encased cassettes into a plurality of cassettes positioned together for packaging and shipping.

2. The cassette assembly apparatus of claim 1 wherein said assembly station includes a glue applicator for applying glue to such sheath.

3. The cassettes assembly apparatus of claim 1 further including a feed conveyor positioned between said magazine and said assembly station, said feed conveyor receiving such portion of such plurality of cassettes removed from said magazine by said insertion member.

4. The cassette assembly apparatus of claim 3 wherein said magazine holds rows of stacked cassettes and said insertion member removes the bottom row of cassettes for placement on said feed conveyor while supporting the immediately adjacent row of cassettes and, after placement of such bottom row of cassettes on said feed conveyor, said insertion member lowers the immediately adjacent row of cassettes into the bottom row position in said magazine.

5. The cassette assembly apparatus of claim 4 wherein said insertion member includes an elevator positioned for vertical movement and a push bar for horizontal movement positioned on said elevator and drive means responsive to signals received from a central processing unit for providing vertical movement to said elevator and horizontal movement to said push bar.

6. The cassette assembly apparatus of claim 4 wherein said magazine includes a floor engaged with a means for imparting vertical movement to said floor, wherein said floor incrementally lowers vertically as said insertion member removes such bottom row of cassettes and supports such immediately adjacent row of cassettes, thereby incrementally separating such bottom row of cassettes and such adjacent row of cassettes.

7. The cassettes assembly apparatus of claim 1 further including a prefold member and a straightening member positioned proximate said sheath conveyor, wherein such sheath is prefolded and straightened along scored lines located in such sheath prior to positioning for engagement with one of such cassettes.

8. The cassette assembly apparatus of claim 1 further including a stacking member for retaining a plurality of stacked sheaths, said sheath conveyor receiving one sheath at a time from said stacking member and moving such sheath into position for engagement with one of such cassettes.

9. The cassette apparatus of claim 1 wherein said assembly station further includes a sheath stacking member, a prefold member, a straightening member and a glue applicator, wherein said sheath conveyor receives one sheath at a time from said stacking member and moves such sheath through said prefold member and said straightening member and said glue applicator to a position proximate said compression conveyor for engagement with such cassette.

10. The cassette assembly apparatus of claim 1 wherein said sheath conveyor grips such sheath with glue applied along the edges of such sheath.

11. The cassette assembly apparatus of claim 1 wherein said assembly station further includes a flight conveyor for receiving such cassettes one at a time and lifting such cassettes into engagement with said sheath with glue applied and further into engagement with said compression member.

12. The cassette assembly apparatus of claim 11 wherein said compression member includes opposed Teflon belts driven by low crush rollers.

13. The cassette assembly apparatus of claim 12 further including flexible fins positioned between said rollers in engagement with said Teflon belts and positioned at each side of the gap between the opposed belts, said side fins for engaging the ends of such cassettes and sheaths as they pass through said compression member.

14. The cassette assembly apparatus of claim 1 further including a compression chute positioned between said compression member and said stacking station, said compression chute including resilient fins for providing continuous pressure on such sheath encased cassette as such cassettes move from said compression member to said stacking station in said compression chute.

15. The cassette assembly apparatus of claim 1 wherein said stacking station includes a bin having side walls, a floor mounted for vertical movement between said side walls, a drive member for incrementally moving said floor upon receipt of commands from a central processing unit, and an end wall mounted for horizontal movement between said sidewalls, wherein said sheath encased cassettes are received from said assembly station and aligned on said floor and said floor lowers incrementally the thickness of a cassette to receive a new plurality of aligned cassettes until said floor is completely lowered at which time said end wall is activated by said central processing unit to push said plurality of aligned cassettes from said fin.

* * * * *